Patented Jan. 3, 1933

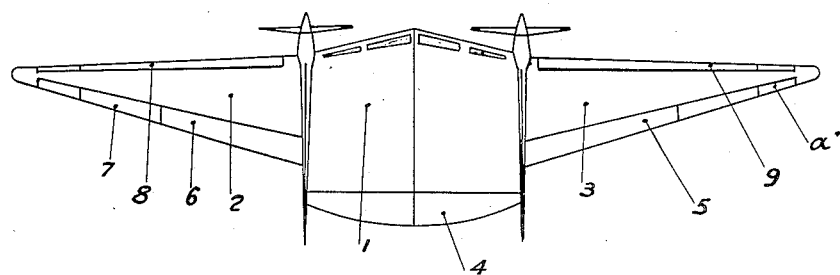
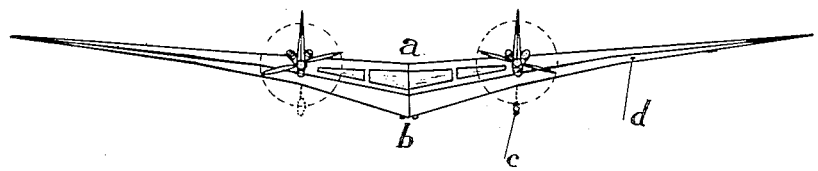
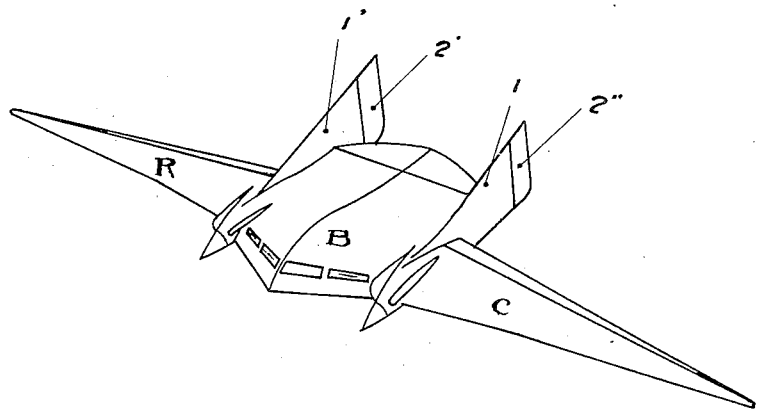

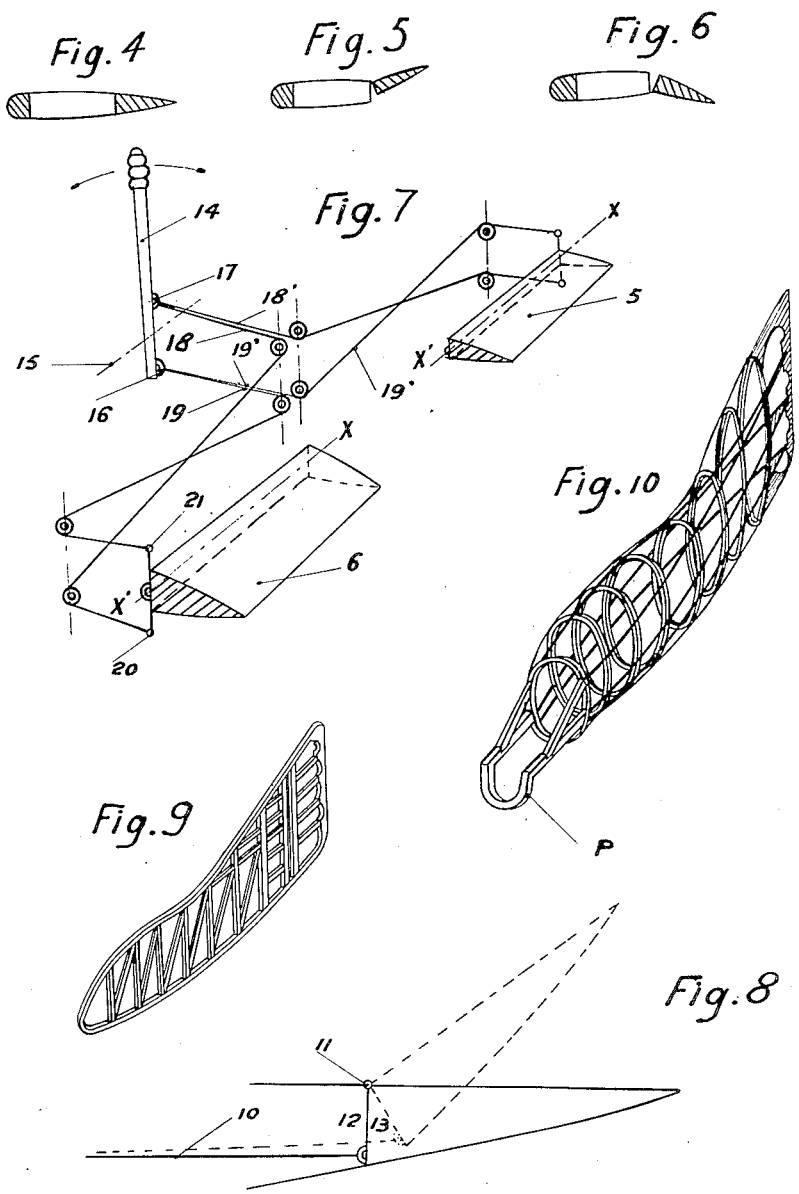

1,893,129

UNITED STATES PATENT OFFICE

JEAN FRÉDÉRIC GEORGES MARIE LÉON CHARPENTIER, OF ST. CLOUD, FRANCE

AIRPLANE CONSTITUTED BY A THREE-ELEMENT WING

Application filed May 26, 1931, Serial No. 540,178, and in France June 4, 1930.

The requirement for an improved aerodynamic efficiency has led guilders of flying machines to substantially suppress all the auxiliary parts thereof, retaining only the wing. The ideal flying machine consists therefor in a wing without any empennage or tail unit adapted to provide alone together the raising force and the steadiness of equilibrium longitudinally, transversally and directionally. It is known it is always possible to obtain longitudinal static steadiness for a wing supposed to be flying alone the moment coefficient of which for zero lifting power is indifferent ($Cm > < 0$) by disposing the centre of gravity at a suitable distance underneath the metacentre. This steadiness exists only for certain conditions of flight corresponding to a given position of the centre of gravity and a given power and to these alone. But the operation of the controlling parts which are supposed of necessity to be constituted solely by a portion of the surface of the wing, as required for the obtention of the desired height, causes through the modification of the whole or of part of the wing section, a modification in the original conditions of equilibrium, a new equilibrium being possible only through a modification in the position of the centre of gravity which is practically impossible.

On the other hand it is necessary to damp the pitching motion the differential equation of which:

$$\frac{Id^2\theta}{dt^2} + \frac{aVd\theta}{dt} + bv^2 = c$$

includes coefficients $a$ and $b$ the main part of which is determined by the tail unit.

For these reasons it is possible to conclude that a normal wing showing a continuous horizontal outline and having neither an arrow-shape, nor a dihedral, nor warping means, cannot fly without a tail plane or an equivalent device.

The object of my invention is a flying machine of the type constituted solely by a three element wing, the central part of which has a constantly rearing moment coefficient for zero lifting power. This central part is of substantially greater chord than the two lateral parts.

According to my invention the magnitude of the surface area of the central element is substantially equal to that of the total surface area of the outer elements while the leading edges of the three elements are substantially in alinement so as to provide in horizontal projection a continuous outline.

This relative arrangement of the parts formed of suitable wing sections allows the aerodynamic resultant on the whole wing to have a lift component the law of displacement of which with varying angles of attack ensures a steady equilibrium for different flying altitudes.

The machine may be provided with vertical drag surfaces or fins say to the rear of the central part.

The central part of the wing provides all or the major part of the longitudinal static stability together with the dynamic stability through the position of its center of gravity, its great depth with reference to the lateral parts and the absolute value of its moment coefficient for zero lifting power, which value provides its preponderancy over the moment coefficient of the lateral parts.

This moment coefficient for zero lifting power which provides a rearing torque produces stability of the airplane flying with its underside lowermost.

In order that the moment coefficient for zero lifting power may constantly provide a rearing torque the central part may show a trailing edge flap adapted to be raised but never lowered.

The considerable chord of the central part allows the coefficient $a$ of the damping torque $$av\frac{d\theta}{dt}$$

of the pitching equation to be determined which ensures a good predetermined damping $$M = \frac{av}{I}$$

depending on the longitudinal moment of inertia $I$ of the machine.

The lateral parts are provided with horizontal elevators which are constituted by flaps disposed along their trailing and leading edges. The trailing flaps may control as usual the movements of elevation by causing the machine to fly downwards when they are deflected downwards and to fly upwards when they are deflected upwards, their movements being in this case controlled in parallel. The particular wing section chosen for the lateral parts is unimportant and is determined for instance by the conditions of use.

The lateral parts of the wing are adapted to increase through their arrangement on either side of the central part the aspect ratio thereof (i. e. the ratio between the square of the span and the surface area $$\lambda = \frac{L^2}{S}\Big).$$

They also contribute to the supporting properties of the machine under good aerodynamic conditions as they may be given a great aspect ratio and also to the dynamic stability and in certain cases to the longitudinal static stability.

The transversal movements are controlled:

(a) Either through the simultaneous and opposite action of the elevation flaps the movements of which are conjugated and obtained independently of their elevational movement.

(b) Or through the action of other flaps disposed further than the elevating flaps with reference to the longitudinal axis of inertia.

The lower central dihedral of the machine contributes to the directional steadiness of the machine as it causes when the machine is moved out of its position of equilibrium an increase in the drag ($\Delta cx$) for the side which is moving forwards the moment of which with reference to the centre of gravity of the machine provides stabilization.

But the stabilizing action of the dihedral is insufficient. Therefore, as stated hereinabove, the machine may be provided with one or more stationary drag surfaces or fins parallel to the plane of symmetry; these fins or tip loss shields may be disposed in particular to the rear of the central part and are adapted to increase the steadiness of the aircraft directionally. These fins may comprise to the rear steering rudders. Two of these vertical drag surfaces or fins may occupy a position of particular interest; to wit above the planes separating the central part from each lateral part of the machine, the aerodynamic resultant or these surfaces passing to the rear of the centre of gravity of the machine. This arrangement of these two drag surfaces or fins has a double or treble object.

(a) It provides all or the major part of the directional stability;

(b) It separates through partitioning, the flow of air over the central part from that over the lateral parts so as to suppress all interactions between these parts (which interactions would moreover vary for each modification in the position of the flaps) and to provide thus over the central part in spite of its small elongation a flow of parallel air threads except for the interactions between the drag surfaces;

(c) It allows the machine to be steered through the reaction of the fluid mass flowing between the fins and deflected well to the rear of the centre of gravity of the machine by the rudders provide to the rear of these drag surfaces.

If required the control as to direction may be obtained by flaps such as $a'$ disposed to either side of the edges of the outer end of the lateral parts of the machine. The flaps $a'$ disposed on either side of the end of the same part are connected through a link system which allows a double wing warping to be produced which reduces the thrust and increases the drag.

The following description and appended drawings show by way of example a form of execution of the invention.

Fig. 1 is a plan view of the machine.
Fig. 2 is a front view thereof.
Fig. 3 is a perspective view thereof.
Figs. 4, 5 and 6 are diagrams illustrating the arrangement of the trailing planes or flaps for flight under ordinary conditions (Fig. 4), for upward flight (Fig. 5) and downward flight (Fig. 6).

Fig. 7 is a diagram illustrating the control in parallel of the trailing flaps on the lateral parts with a view to manoeuvring the machine vertically.

Fig. 8 shows the means for controlling the trailing flap or plane of the central part which can only be raised.

Figs. 9 and 10 show two forms of execution of the drag surfaces or fins.

The machine comprises a central part 1 and two lateral parts 2 and 3 (Fig. 1).

In the central part are the navigation cabin, the pilot house, the machine rooms etc. and also the passenger's cabin which may extend into the lateral parts 2 and 3 which contain the luggage room, the postal or the like freight and the reservoir. Of course the fuel tanks are placed as far as possible from the inhabited parts.

The central part of the machine may be provided with a movable trailing edge or flap which may only be raised and cannot be lowered with reference to its starting position for which its outline is an extension of the outline of the wing. This is obtained by the arrangement at the upper part of the flap of the hinge connecting it with the body of the machine.

Fig. 8 shows a device controlling the flap in a manner such that it will allow its rising motion. The pilot acting on any arrangement not shown pushes the connecting rod 10 which forces the flap to rise through the torque with reference to the hinge 11 of the stress transmitted by the connecting rod. The location of the hinge 11 prevents any positive or downward deviation of the flap as any effort in the corresponding direction is equilibrated by the reaction of the wall 12 against the wall 13.

The lateral parts are provided with flaps along their trailing edge or along their leading edge or along both edges. The trailing flaps are adapted to control alone all elevational movements.

Fig. 4 shows diagrammatically the flap in its normal position of use; Fig. 5 shows the flap raised so as to produce a torque urging the machine to rise whereas Fig. 6 shows the flap lowered for descent.

During these movements the flaps of the lateral parts are controlled simultaneously and in parallel.

Fig. 7 shows diagrammatically a system for controlling in parallel the horizontal flaps 5 and 6. The control lever 14 is adapted to pivot round an axis 15 perpendicular to the plane of symmetry of the machine. To either side of this axis of rotation the control lever carries straps 16 and 17 to which are secured cables 18 and 18', 19 and 19' the other end of which is secured to the arms of the sail controlling link system 20, 21.

The same flaps may also ensure transversal movement: In this case a second control device transmits simultaneous opposed movements.

Fig. 1 illustrates two possible alternative arrangements.

The arrangement shown on starboard relates to the case where the same flap 5 ensures longitudinal and transversal movements whereas the arrangement shown on portside shows two independent flaps 6 and 7. The flaps 7 furthest removed from the longitudinal axis of inertia control transversal movement and the flaps 6 furthest removed from the transversal axis of inertia ensure longitudinal control.

In the case of the airplane shown in Fig. 3, the drag surfaces of fins 1, 1' disposed over the planes separating the central part 1 from the lateral parts 2, 3 of the machine are provided with rudders 2', 2''.

These drag surfaces or fins provided according to the invention may be executed in any suitable manner and in particular:

(a) In a manner similar to simple ribs i. e. as trellis-work (Fig. 9) or as a compartment or caisson rib; the covering not shown in Fig. 9 may increase the value of the resistant torque.

(b) In a manner similar to hydroplane shells formed by frames and rails. It is possible to execute staffs forming the fins; the first frame of the staff may carry the motor or its support P (Fig. 10). The advantage of this arrangement lies in that the tractional stresses are transmitted to the machine through a large number of points of the wing girder. These staves forming the drag surfaces are integral with the wing structure and replace elements of the wing beam. The frames of the staves are disposed on either side of the rails or lines of said beam and the covering provides the continuity of surface required for the whole arrangement.

The machine in vertical projection shows an upper dihedral $a$ and a lower dihedral $b$ transverse to its plane of symmetry and moreover two pairs of lower dihedrals such as $c$ and $d$.

The above description and appended drawings show by way of example a form of execution of the invention, but it should be well understood that:

(a) Any machine to which the above features are applied falls within the scope of the invention which is by no means limited to the types shown and described;

(b) Any suitable stabilizing and control means may be substituted for those shown or cooperate therewith. The principle of a central stabilizing part is applicable to any machine of the so-called flying wing type.

(c) The machine may be made of any material;

(d) Certain features such as the landing system with its keel bottom integral with the axle or the drag surfaces or the sails on the leading or trailing edge are applicable to any other type of flying machine. The drag surfaces are in particular applicable to any machine of the so-called flying wing type in order for instance to make compensation for a small elongation or to separate the non-variable part of the wing from the part along which the flow of air is variable with reference to the former under the action of a sail for instance or again to separate two deformable surfaces adapted to act one on the other during their deformation.

What I claim is:

1. A tail-less flying machine comprising only a central element having a wing section ensuring stability and two lateral symmetrical carrier elements having a smaller chord than the central element and an area substantially equal to half the area of said central element, the leading edges of the said elements being substantially in alinement and the different elements being separated by planes of discontinuity.

2. A tail-less flying machine comprising only a central element having a wing section ensuring stability and two lateral symmetrical carrier elements having a smaller chord than the central element and an area substantially equal to half the area of said central element, the leading edges of the said elements being substantially in alinement and the different elements being separated by planes of discontinuity, a trailing flap forming the rear of the central element, means for raising said flap with reference to said element and means preventing its upper surface from passing underneath the extension of the upper surface of the central element.

3. A tail-less flying machine comprising only a central element having a wing section ensuring stability and two lateral symmetrical carrier elements having a smaller chord than the central element and an area substantially equal to half the area of said central element, the leading edges of the said elements being substantially in alinement and the different elements being separated by planes of discontinuity, a trailing flap forming the rear of the central element, means for raising said flap with reference to said element, means preventing its upper surface from passing underneath the extension of the upper surface of the central element and vertical fins carried to the rear of the machine above the planes of separation between the three elements.

4. A tail-less flying machine comprising only a central element having a wing section ensuring stability and two lateral symmetrical carrier elements having a smaller chord than the central element and an area substantially equal to half the area of said central element, the leading edges of the said elements being substantially in alinement and the different elements being separated by planes of discontinuity, and control means such that the total moment coefficient of the machine at zero lift provides a rearing motion for all flying attitudes.

5. A tail-less flying machine comprising only a central element having a wing section ensuring stability and two lateral symmetrical carrier elements having a smaller chord than the central element and an area substantially equal to half the area of said central element, the leading edges of the said elements being substantially in alinement and the different elements being separated by planes of discontinuity, transverse downwardly opening dihedrals being provided under the planes of discontinuity and at a point under each lateral element.

In testimony whereof I affixed my signature.

JEAN FRÉDÉRIC GEORGES MARIE
LÉON CHARPENTIER.